(12) United States Patent
Wieczorek

(10) Patent No.: US 11,686,864 B2
(45) Date of Patent: Jun. 27, 2023

(54) SCINTILLATOR ARRAY WITH HIGH DETECTIVE QUANTUM EFFICIENCY

(71) Applicant: KONINKLIJKE PHILIPS N.V., Eindhoven (NL)

(72) Inventor: Herfried Karl Wieczorek, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/276,519

(22) PCT Filed: Sep. 13, 2019

(86) PCT No.: PCT/EP2019/074571
§ 371 (c)(1),
(2) Date: Mar. 16, 2021

(87) PCT Pub. No.: WO2020/064373
PCT Pub. Date: Apr. 2, 2020

(65) Prior Publication Data
US 2021/0270979 A1    Sep. 2, 2021

(30) Foreign Application Priority Data
Sep. 25, 2018  (EP) .................................... 18196668

(51) Int. Cl.
*G01T 1/20*    (2006.01)
(52) U.S. Cl.
CPC .......... *G01T 1/2002* (2013.01); *G01T 1/2006* (2013.01); *G01T 1/2018* (2013.01)

(58) Field of Classification Search
None
See application file for complete search history.

(56) References Cited

U.S. PATENT DOCUMENTS

| 4,533,489 A | 8/1985 | Utts |
| 4,658,141 A | 4/1987 | Wilt |

(Continued)

FOREIGN PATENT DOCUMENTS

| EP | 2793052 A1 | 10/2014 |
| WO | 199504289 A1 | 2/1995 |
| WO | 2012004703 A2 | 10/2012 |

OTHER PUBLICATIONS

International Search Report and Written Opinion of PCT/EP2019/074571, dated Oct. 16, 2019.

(Continued)

*Primary Examiner* — Edwin C Gunberg

(57) ABSTRACT

The invention relates to a scintillator array for a radiation imaging detector. A method for manufacturing the scintillator array, a radiation imaging detector, and a medical imaging system are also provided. The scintillator array has a radiation receiving face and an opposing scintillation light output face. The scintillator array includes a plurality of scintillator elements and a separator material that is disposed between the scintillator elements. The separator material consists of separator particles that have a predetermined size and with this the separator material provides an optical separation of the scintillator elements by providing a physical spacing between the scintillator elements, the width of which spacing is defined by the separator particle size.

15 Claims, 3 Drawing Sheets

(56) References Cited

U.S. PATENT DOCUMENTS

| | | | |
|---|---|---|---|
| 5,187,369 A | 2/1993 | Kingsley | |
| 5,256,244 A | 10/1993 | Ackerman | |
| 5,572,289 A | 11/1996 | Cheng | |
| 2007/0269009 A1* | 11/2007 | Metzger | G21K 4/00 378/98.8 |
| 2012/0121067 A1 | 5/2012 | Hayden | |
| 2014/0301527 A1 | 10/2014 | Morimoto | |
| 2015/0241570 A1 | 8/2015 | Perna | |
| 2016/0109587 A1 | 4/2016 | Wieczorek | |

OTHER PUBLICATIONS

Zhu, Zhichao et al "Improvement of Light Extraction of LYSO Scintillator by using a Combination of Self-Assembly of Nanospheres and Atomic Layer Deposition", Optics Express, vol. 23, No. 6, Mar. 2015.

* cited by examiner

SCINTILLATOR ARRAY WITH HIGH DETECTIVE QUANTUM EFFICIENCY

CROSS-REFERENCE TO PRIOR APPLICATIONS

This application is the U.S. National Phase application under 35 U.S.C. § 371 of International Application No. PCT/EP2019/074571, filed on Sep. 13, 2019, which claims the benefit of European Patent Application No. 18196668.0, filed on Sep. 25, 2018. These applications are hereby incorporated by reference herein.

FIELD OF THE INVENTION

The invention relates to a scintillator array for use in a radiation imaging detector. The scintillator array finds particular application in medical imaging systems such as positron emission tomography (PET), single photon emission computed tomography (SPECT), X-ray and computed tomography (CT) imaging systems.

BACKGROUND OF THE INVENTION

Arrays of scintillator elements are routinely used in radiation imaging detectors in order to detect and thereby image ionizing radiation such as X-ray and gamma radiation. This so-called "indirect detection" method is used for example in medical imaging systems such as positron emission tomography (PET), single photon emission computed tomography (SPECT), and computed tomography (CT) imaging systems. The materials of such scintillator elements are selected so as to generate a pulse of scintillation light in response to each received X-ray or gamma quant. The scintillation light is subsequently detected by a photodetector array that is optically coupled to the scintillator elements.

Scintillator elements that are typically used in these arrays include scintillation sticks with a three-dimensional rectangular shape. The incident gamma photon is received through the surface of the rectangular stick that faces the subject of the image and the photodetectors are located at the opposite surface. The sides of the scintillator sticks face each other in the array. In assembling the array, direct contact between the sides of the scintillator elements needs to be avoided, because such contact may lead to increased optical transmission within the array, resulting in undefined and unstable optical properties.

In order to avoid direct contact, scintillator arrays in radiation imaging are commonly assembled with reflective spacer layers in between the scintillation elements. For example, in digital PET systems, scintillation sticks made of single LYSO crystals may be wrapped in Teflon or separated by Vikuiti sheets. Additional sticky layers are used to ensure adherence to the sticks. However, altogether these separating layers have thicknesses up to 0.2 mm, resulting in a significant amount of space where incoming gamma photons cannot be detected. In a PET detector with a 4 mm pixel pitch, which is a common size in commercial PET imaging systems, the space taken up by these separating layers results in a reduced detective quantum efficiency (DQE).

DQE is a measure for image quality that describes how effectively an imaging systems captures information as compared to an ideal detector. Radiation imaging detectors with a higher DQE are better able to detect small, low-contrast objects. This is of particular importance in medical imaging where the ability to visualize these particular types of objects can be more important than spatial resolution.

In radiation imaging detectors there is however a constant desire to improve image resolution. A conventional approach to this is to reduce the lateral dimensions of each scintillator in the array. Pre-clinical PET and SPECT systems may have a scintillator pitch of 1 mm or less. While this may improve the value of the spatial resolution, because the reflective spacer layers in the scintillation array cannot be made thinner, these configurations suffer from a further loss of DQE. Due to this, for these systems, the quality of the detector could even be reduced through the conventional approach.

SUMMARY OF THE INVENTION

The present invention seeks to provide a scintillator array with improved DQE for a radiation imaging detector. Further advantages from the described invention will also be apparent to the skilled person. Thereto a scintillator array, a method for manufacturing the scintillator array, a radiation imaging detector, and a medical imaging system are provided. The scintillator array for a radiation imaging detector has a radiation receiving face for receiving radiation and an opposing scintillation light output face for interfacing with a photodetector array. The scintillator array comprises a plurality of scintillator elements and a separator material, which separator material is disposed between the scintillator elements. The separator material consists of separator particles, which separator particles have a predetermined size, and the separator material is configured to provide an optical separation of the scintillator elements by providing a physical spacing between the scintillator elements, the width of which spacing is defined by the separator particle size.

In this context optical separation of the scintillator elements means that the scintillation photons generated in a scintillator element cannot easily pass out of that scintillator element and into to another scintillator element. When scintillator elements are optically separated, the majority of the generated scintillation photons are contained in the scintillator element where they were generated, for example by means of total internal reflection.

For the separator particles size, the size is determined by their diameter. The separator particles can be identical in shape and size, but this is not essential. As long as the particles have a well-defined size, meaning that their size and shape variations do not lead to irregular spacing between the scintillator elements and the width of the spacing is determined by the average diameter of the particles. In an embodiment of the invention, separator particles can be provided in the form of a powder. Fine powders of chemically inert substances with well-defined particles of a pre-determined size, for example $TiO_2$, $Al_2O_3$ or MgO, oxides like $SiO_2$, mineral powders like $CaCO_3$ or silicates, are readily available. In an alternative embodiment, the separator particles can be microbeads such as polymer microbeads, for example mono-sized cross-linked PMMA or PS beads.

For an optimal optical separation between the scintillator elements, it is preferred that the predetermined size of the separator particles is at least larger than the wavelength of the scintillation light. When the separator particles have a size that is larger than the wavelength of the scintillation light, the physical spacing is such that scintillation photons can no longer easily travel between scintillator elements and will instead reflect at the internal surface of the scintillator elements. For example, the separator particles may have a size of at least 0.5 µm, preferably at least 1 µm. In further examples, the separator particles have a size in the range of 1 μm to 10 μm, and more preferably in the range of 1 μm to 5 μm.

In an embodiment of the scintillator array the sides of the scintillator elements are partly covered with separator particles. Preferably, the coverage of the sides (210) of the scintillator elements (130) in separator particles (150) is less than 50%, more preferrably less than 10%, and even more preferably between 0.1% and 5%. Typically, for particles of around 1 μm diameter, such a covering will have approximately 1000 particles per $mm^2$, the typical covering lying in a range between 100 up to 10000, or possibly up to 100000 particles per mm2. For particles of around 5 μm diameter, such a covering will have approximately 100 particles of roughly 5 μm diameter per $mm^2$, the typical covering lying in a range between 10 and a few thousand particles per $mm^2$.

It is an option for the scintillator array according to be configured to detect gamma radiation or x-ray radiation. As a further option, the gamma radiation may be the gamma radiation used in PET imaging, which typically has an energy of 511 keV, or the gamma radiation used in SPECT imaging, which typically has an energy of 140 keV.

The method of manufacturing the scintillator array comprises the steps of: providing individual scintillator elements, applying separator particles to at least one side of the scintillator elements, and assembling the individual scintillator elements into an array such that separator particles are situated between opposing sides of adjacent scintillator elements. In a preferred embodiment of the method, the separator particles are provided in the form of a powder, and the separator particles are applied by brushing or spraying the scintillator elements with the powder or by dipping the scintillator elements in the powder.

The radiation imaging detector comprises the scintillator array as described above and a photodetector array. The photodetector array comprises a plurality of photodetector pixels, and the plurality of photodetector pixels are in optical communication with the scintillator elements of the scintillator array. In an embodiment of the detector, the optical communication comprises a one-to-one (also written as 1:1) coupling between the photodetector pixels and the scintillator elements. The 1:1 coupling is an arrangement where light from each scintillator element is detected by a unique photodetector element.

The medical imaging system comprising the radiation imaging detector as described above. In exemplary embodiments, the imaging system may be a PET imaging system, a SPECT imaging system, a CT imaging system, an x-ray system or a combination thereof.

An advantage of the current invention is that the spacing between the scintillator elements can be reduced whilst retaining reliable optical properties. By reducing the spacing between the scintillator elements, the DQE of the array is improved.

A further advantage lies in that the scintillator array of the current invention is that the spacing between the scintillator elements may be controlled by choosing the predetermined size for the separator particles.

BRIEF DESCRIPTION OF THE FIGURES

In the following drawings.

FIG. 2 illustrates the optical separation by the separator particles of the scintillator elements in the array.

DETAILED DESCRIPTION OF THE INVENTION

Figure 1A:
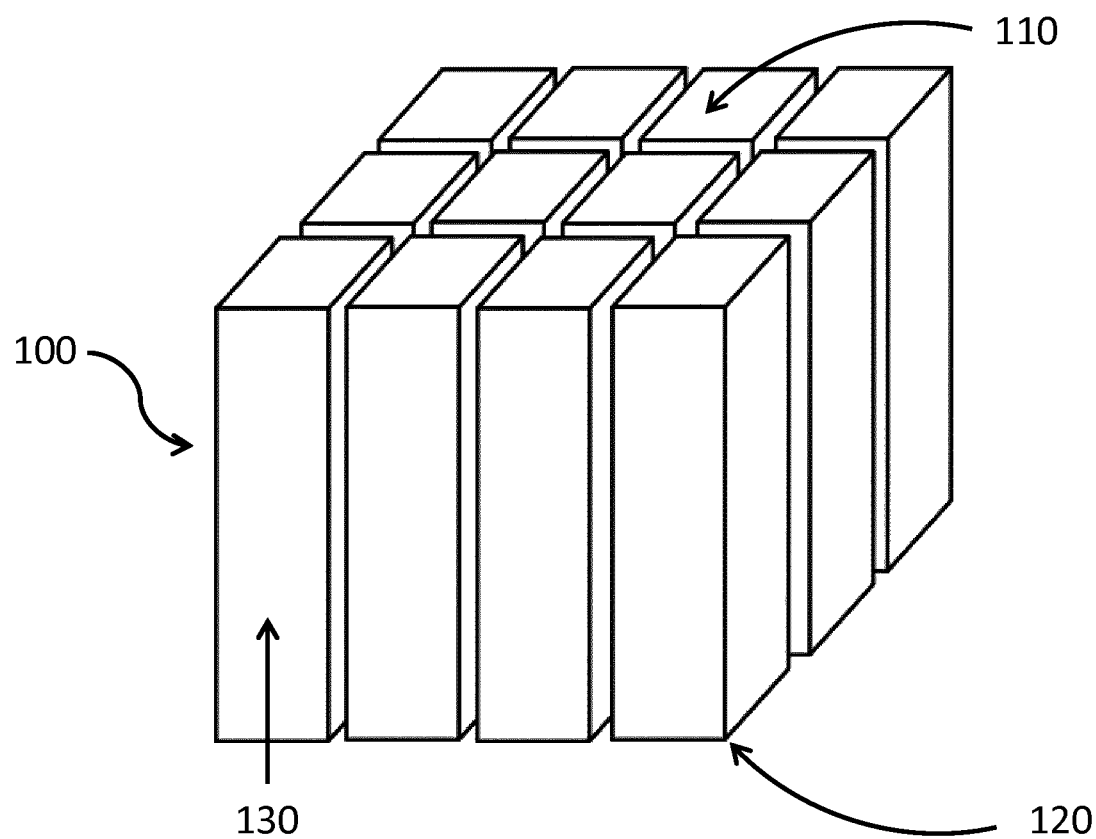
FIG. 1 illustrates in FIG. 1a a scintillator array in accordance with some aspects of the invention, and in FIG. 1b a top view of the scintillator array in accordance with some aspects of the invention.

FIG. 1 illustrates in FIG. 1a a first scintillator array 100 in accordance with some aspects of the invention. The scintillator arrays of FIG. 1 may be used to detect ionizing radiation, for example to detect gamma radiation in a PET or a SPECT imaging system, or x-ray radiation. The scintillator array 100 has a radiation receiving face 110 for receiving radiation and an opposing scintillation output face 120 for interfacing with a photodetector array. The array 100 comprises a plurality of scintillator elements 130. In the example shown in FIG. 1, the scintillator elements have a square cross-section and form a 3×4 rectangular grid. However, this is merely an illustration and other geometries in cross-section and arrangement are also possible. In practice, e.g. an array for a PET detector will be built from typically 8×8 scintillator crystals of each 4×4 mm size to be in 1:1 correspondence with a photodiode detector array, or to form larger modules with e.g. 24×32 crystals.

The scintillator elements 130 of scintillator array 100 may be formed from a range of scintillator materials including single crystal, polycrystalline or ceramic materials. Polycrystalline or ceramic materials typically have processing advantages over their single crystal counterparts in that they may typically be formed using simpler processing techniques with lower cost equipment. Suitable scintillator compositions for use in detecting gamma radiation include, but are not limited to garnets, e.g. compositions defined by $(Lu, Gd)_3(Al, Ga)_5O_{12}$:Ce, $(Y, Gd)_3(Al, Ga)_5O_{12}$:Ce, Lutetium-yttrium oxyorthosilicate, i.e. LYSO, gadolinium oxysulfide, i.e. GOS, $CeBr_3$, and so forth. Suitable material compositions for use in detecting X-ray radiation include but are not limited to garnets and cesium iodide, e.g. CsI:Tl.

Figure 1B:
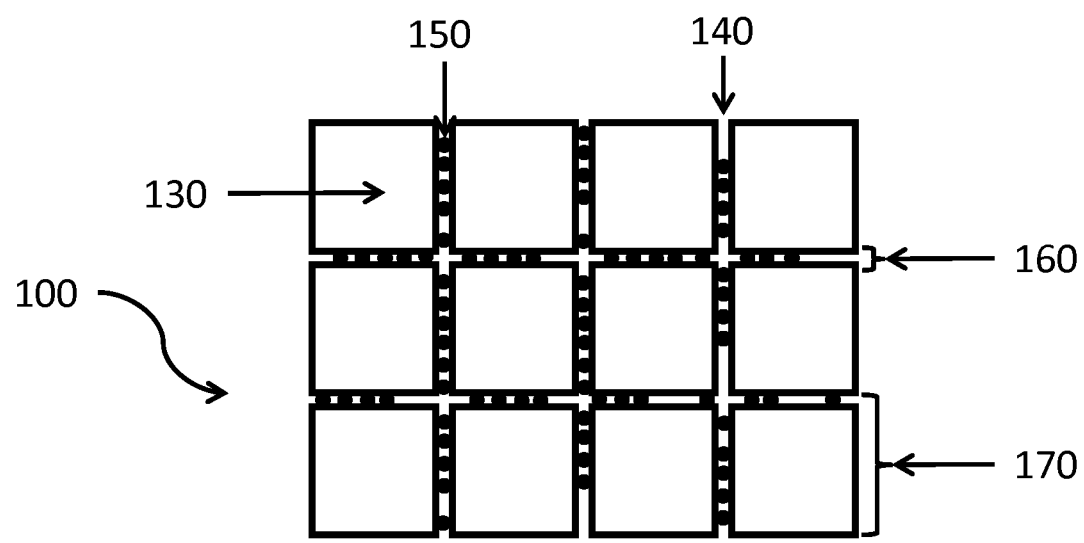

FIG. 1b shows a top view of the scintillator array 100 in accordance with some aspects of the invention. The view is facing the receiving face of the scintillator array. It is noted that this figure, as well as the other figures are not to scale and are only intended to be a schematic illustration. In particular, the size of the spacing 160 between the scintillator elements as compared to the pixel pitch 170 is greatly exaggerated since otherwise it would not be visible. Scintillator elements 130 typically have a width of 4 mm, while the separator particles 150 may have a size of at least 0.5 μm, preferably at least 1 μm. In further examples, the separator particles have a size in the range of 1 μm to 10 μm, and more preferably in the range of 1 μm to 5 μm.

FIG. 1b shows the scintillator array 100 comprising the plurality of scintillator elements 130. In this view also the separator material 140 is shown that is disposed between the scintillator elements 130. The separator material 140 consist of separator particles 150, shown in FIG. 1b as dots between the scintillator elements 130. These particles 150 provide the physical space, or gap, 160, between the scintillator elements 130 that is defined by their size. Such a gap is present between all scintillator elements at the sides where the scintillator elements face each other.

Figure 2A:
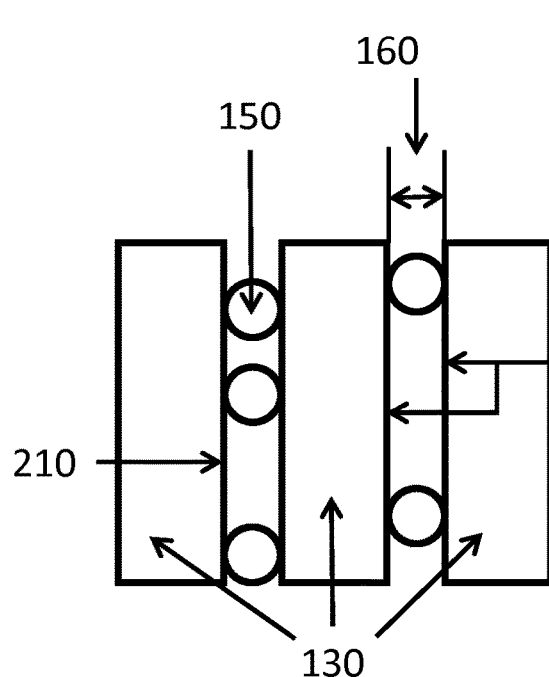
FIG. 2a illustrates optical separation of the scintillator elements using a covering in part by separator particles of less than 50%.
Figure 2B:
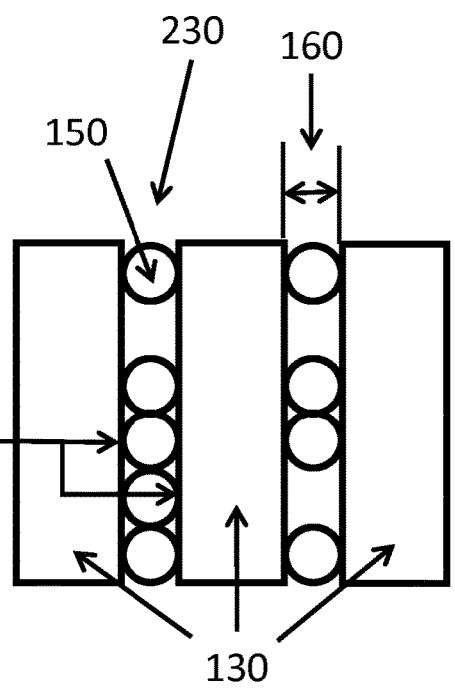
FIG. 2b illustrates optical separation of the scintillator the scintillator elements by a dense layer of separator particles.

FIG. 2 further illustrates the optical separation by the separator particles of the scintillator elements in the array. FIG. 2a illustrates optical separation of the scintillator elements using a covering in part by separator particles of less than 50%, and FIG. 2b illustrates optical separation of the scintillator the scintillator elements by a dense layer of separators particles.

FIG. 2a schematically shows part of a scintillator array. Three scintillator elements 130 of the array are shown. The scintillators have sides 210. The two sides where the scintillator elements face each other 220 need to be optically separated in a reliable manner to avoid increased transmission within the array. For this purpose, a separator material consisting of separator particles 150 is used. In FIG. 2a the particles are illustrated as spheres with substantially equal diameters, but this is merely an example. The figure shows that the particles 150 provide a physical spacing 160 between the scintillator elements. The size of spacing 160 is determined by the particle size, which is the diameter of particles.

In this configuration, the sides 210 of the scintillator elements are covered in particles. With the single particles between the two opposing sides 220, both sides are considered to be covered in the particles. In FIG. 2a the sides of the scintillator elements are partly covered in particles 150. This is also the situation in the top view of FIG. 1a, where also open, uncovered spaces are illustrated between the particles.

FIG. 2b also schematically illustrates part of a scintillator array. In the arrangement of FIG. 2b, a high number of particles 150 is used to separate the scintillator elements 130. The particles 150 form a dense layer 230 that separates the scintillator elements. The spacing 160 is determined by the size of the particles 150. In this arrangement the layer 230 covers the opposing sides 220 of the adjacent scintillator elements. In a scintillator array, up to a monolayer of particles could be used to separate the scintillator elements 130. When more particles are used, the particles will be stacked in the spacing 160 with the result that the width of the spacing is no longer determined by the separator particle size. However, a covering of exactly a monolayer of separator particles can, in certain geometries of particles and light reflection angles, have the effect of enhancing optical coupling between adjacent scintillator elements instead of providing optical separation. Such a monolayer configuration is not considered to provide an optical separation of the scintillator elements. In order to avoid this effect, is preferred that the sides of the scintillator elements have a covering of separator particles of less than of monolayer of particles. It is particularly preferred that less than 50% of the surface of the sides of the scintillator elements is covered in separator particles, more particularly less than 10%, and even more particularly preferred is a covering between 0.1% and 5%.

The scintillator elements of the scintillator array preferably have polished sides. The polished sides ensure total internal reflection within the scintillator elements. Total internal reflection accounts for a large part of the reflectivity of the scintillators, due to the high index of refraction typically found with scintillator materials, and an additional reflective layer is therefore not essential. Consequently, it is also not necessary for the separator particles to have either reflective or optically absorbing properties. It may, however, be beneficial for the scintillator elements to have reflective properties.

Preferably, the separator particles are chemically inert materials such as metal oxides. In case reflective properties are preferred, reflective metal oxides such as for example $TiO_2$ or $Al_2O_3$ can be used. Alternatively, the separator particles can be microbeads such as polymer microbeads, for example mono-sized cross-linked PMMA or PS beads. Polymer microbeads have the advantage that they can be engineered with respect to size, uniformity of shape and functionality such as refractive index and temperature stability.

Figure 3:
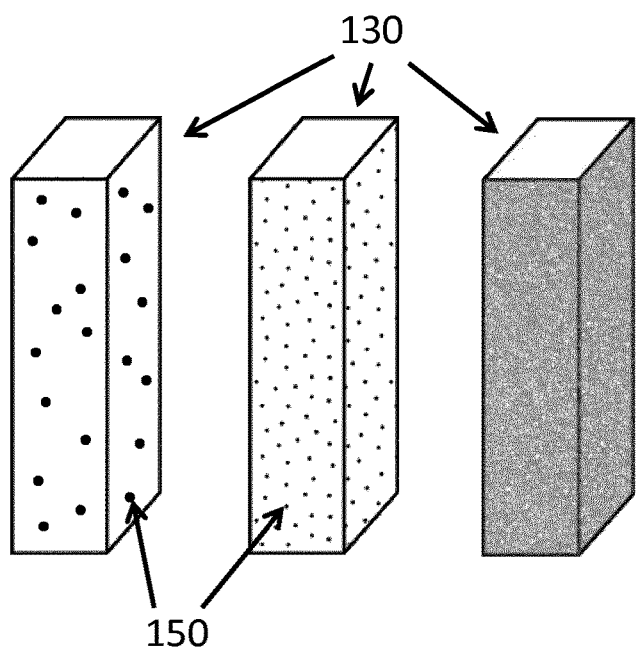
FIG. 3 illustrates individual scintillator elements, provided with various amounts of separator particles.

FIG. 3 illustrates individual scintillator elements, provided on several of their sides with various amounts of separator particles. The scintillator elements are partly covered with separator particles. A high degree of coverage is not necessary to achieve optical separation of the scintillator elements, and a covering in part may be easily achieved in a manufacturing process, e.g. by the method described below. The scintillator element on the right hand side of the figure represents a coverage of the sides 210 of the scintillator elements 130 which is less than 50%, and the middle figure a coverage which is 10%. The scintillator element on the left is only partly covered with separator particles, but with a very low, sparse, covering of particles. This is the most preferred coverage of 0.1%-5%, which allows easy manufacture and a high degree of internal reflection at the surface to air interface of the scintillator element. Such a sparse covering will have only a few particles per $mm^2$, typically in the range of 10 to 10000 particles per $mm^2$ for particles with a size in the range of 1-10 µm, but this already suffices to keep the scintillator elements optically separated.

Figure 4:
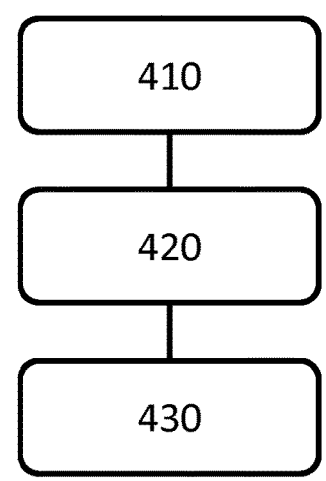
FIG. 4 illustrates an example of a method of manufacturing a scintillator array.

FIG. 4 shows a flow-diagram of an example of a method of manufacturing a scintillator array in accordance with the invention. In this method, first individual scintillator elements are provided at 410. These elements have been manufactured individually prior to the manufacture of the array. Once provided, separator particles are applied to at least one side of the scintillator elements at 420. It is also possible to apply the particles to multiple sides. Preferably, particles are mainly applied to the sides of the scintillator elements that will be facing other scintillator elements. This leaves the receiving face and output face of the assembled array substantially free of particles.

The separator particles can be provided in the form of a powder. Fine powders of chemically inert substances with well-defined particles of a pre-determined size, for example $TiO_2$, $Al_2O_3$ or MgO, oxides like $SiO_2$, mineral powders like $CaCO_3$ or silicates, or for example polymer microbeads, are readily available. Particles of the powder will stick to the surfaces of the scintillator elements of their own accord and can therefore be easily applied by e.g. brushing or spraying the scintillation elements or by dipping these in the powder.

After the separator particles have been applied, the individual scintillator elements are assembled into an array at 430. For this assembly, the scintillator elements are placed next to and up against each other, such that separator particles are situated between opposing sides of adjacent scintillator elements. The assembly step 430 is preferably performed by a dedicated manufacturing robot.

Figure 5:
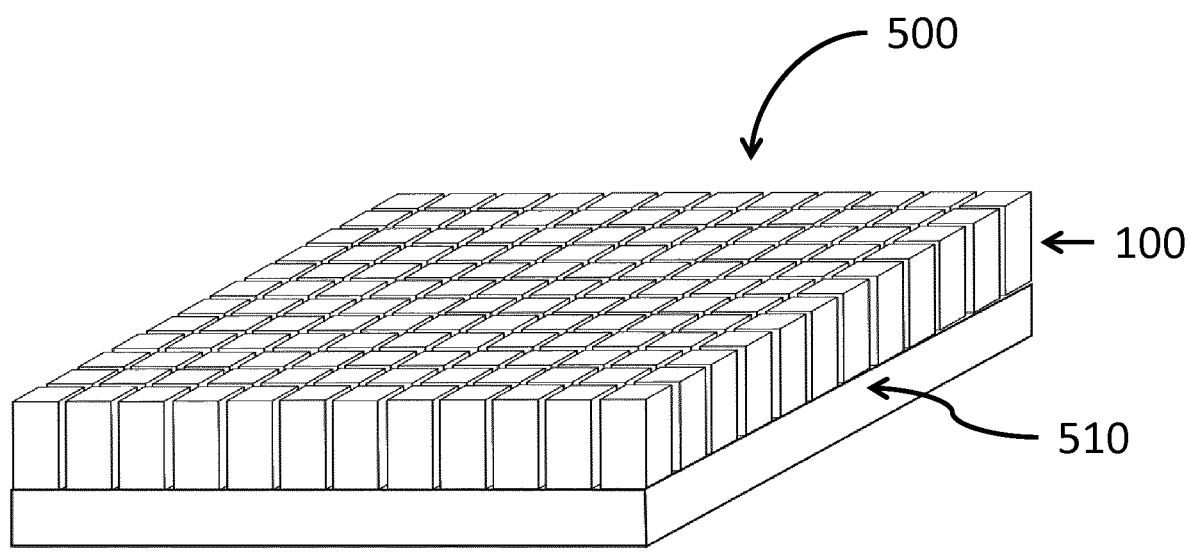
FIG. 5 illustrates a radiation imaging detector that includes a scintillator array and a photodetector array.

FIG. 5 illustrates a radiation imaging detector 500 that includes a scintillator array 100 and a photodetector array 510. Photodetector array 510 includes a plurality of photodetector pixels that are in optical communication with the scintillator array 100. Photodetector array 510 may for example be a silicon photomultiplier array, i.e. SiPM, array of photodiodes, for example a Philips Digital Photon Counting, PDPC, SiPM photodetector array. Alternatively, photodetector array 510 may include an array of avalanche photodiodes, photomultiplier tubes, position sensitive photodetectors, and so forth. In these examples the photodiodes, photomultipliers and photodetectors form the photodetector pixels. Radiation imaging detector 500 may for example be used in a SPECT, a PET, an X-ray or a CT imaging system.

Preferably the radiation imaging detector has a 1:1 (one to one) coupling between the photodetector pixels of the photodetector 510 and the scintillator elements of the scintillator array 100. The 1:1 coupling is an arrangement where light from each scintillator element is detected by a unique photodetector element. This arrangement has the advantage of allowing the radiation imaging detector 500 to be used for digital photon counting as part of an entirely digital image acquisition chain. In case of partial transmission of the scintillation light, and/or in case of Compton scatter in PET and SPECT imaging, not only the scintillator elements that is mainly impacted by the gamma photon will respond, but also its neighboring scintillator elements. In such a case it is preferred to use nearest-neighbor readout of the photodetector pixels.

Figure 6:
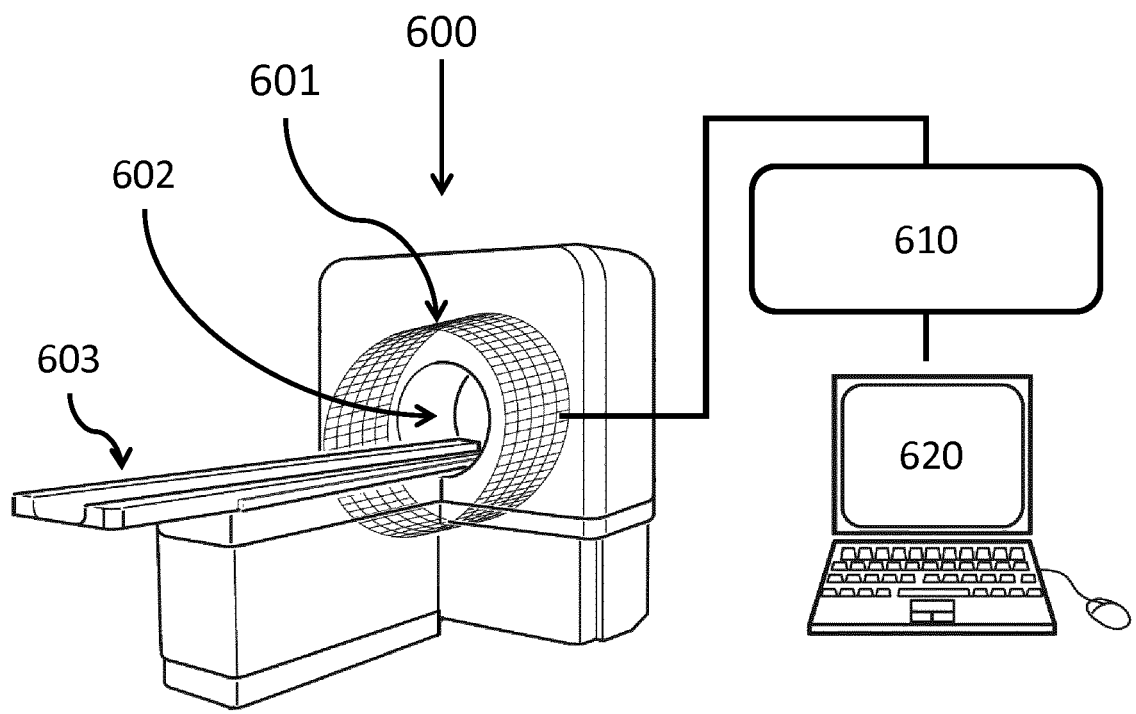
FIG. 6 illustrates a medical imaging system that includes radiation imaging detectors comprising the scintillator arrays according to the invention.

In order to illustrate the principles of the present invention a scintillator array, it is illustrated in FIG. 6 with particular reference to the detection of gamma quanta in a PET and a SPECT imaging system. Various embodiments of a scintillator array are described, and it is to be appreciated that the embodiments may be combined to provide further benefits. It is also to be appreciated that the scintillator array finds application in other medical imaging systems such as in X-ray and CT imaging systems. The scintillator array may also be used in hybrid imaging systems such as PET-CT or SPECT-CT, X-ray—SPECT, or with a magnetic resonance imaging system, i.e. MRI, in a hybrid PET-MRI imaging system. Moreover, the scintillator array may be used in the imaging of ionizing radiation in applications in general that are both within and beyond the medical field.

FIG. 6 illustrates a medical imaging system in the form of a PET imaging system 600 that includes one or more radiation imaging detector rings circumscribing an imaging region with a field of view 601. Each detector ring in FIG. 6 has multiple radiation imaging detectors 500 that are arranged with respect to field of view 602 to detect gamma quanta emitted from a distribution of radiotracer therein. Patient support 603 is also illustrated in FIG. 6. Image reconstruction unit 610 is arranged to receive data from photodetector array 510 of radiation imaging detector 500, the data corresponding to detected gamma quanta. Image reconstruction unit 610 is configured to generate a PET image corresponding to the radiotracer distribution. Image reconstruction unit 610 may for example employ an iterative reconstruction technique to generate the image. In general, iterative reconstruction algorithms include the steps of: i) providing an estimate of the radiotracer distribution in field of view 602; ii) projecting the estimated radiotracer distribution onto radiation imaging detector 500 to provide a projected estimated scintillation light distribution; receiving data indicative of a measured scintillation light distribution; comparing the measured scintillation light distribution with the projected estimated scintillation light distribution; and updating the estimate of the radiotracer distribution in the field of view based on the comparing step. When image reconstruction in complete, the image is provided on a viewing device 620. In FIG. 5, a laptop is shown as an example of a viewing device 620, but suitable alternative may also be used, such as a workstation, desktop computer, mobile viewing device etc.

Alternatively, the imaging system may be a SPECT imaging system. The radiation imaging detectors of such a SPECT system may be arranged in a small number of individual detectors, arranged around the FOV 602, to provide data from a limited number of viewing angles. Even a single radiation imaging detector 500 may be used instead of a detector ring. When a limited number of detectors or a single detector is used, the radiation imaging detector may be mounted such that they can rotate around the FOV 602, such that data can be collected at multiple angles of interest and to acquire sufficient data for SPECT image reconstruction. In another configuration radiation imaging detector or detectors may remain in a fixed position during the entire data collection period and thereby generate a gamma scintigraphy image.

In summary, a scintillator array for a radiation imaging detector has been described. The scintillator array has a radiation receiving face and an opposing scintillation light output face. The scintillator array includes a plurality of scintillator elements and a separator material that is disposed between the scintillator elements. The separator material consists of separator particles that have a predetermined size and with this the separator material provides an optical separation of the scintillator elements by providing a physical spacing between the scintillator elements, the width of which spacing is defined by the separator particle size.

Variations to the disclosed embodiments can be understood and effected by those skilled in the art in practicing the claimed invention, from a study of the drawings, the disclosure, and the appended claims. It is noted that the various embodiments may be combined to achieve further advantageous effects.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage. Any reference signs in the claims should not be construed as limiting the scope.

What is claimed is:

1. A scintillator array for a radiation imaging detector, the scintillator array having a radiation receiving face for receiving radiation and an opposing scintillation light output face for interfacing with a photodetector array;
   wherein the scintillator array comprises a plurality of scintillator elements and a separator material, which separator material is disposed between the scintillator elements;
   wherein the separator material consists of separator particles, which have a predetermined size; and
   wherein the separator material is configured to provide an optical separation of the scintillator elements by providing a physical spacing between the scintillator elements, a width the physical spacing being defined by the separator particle size.

2. The scintillator array according to claim 1 wherein the separator particles have a size of at least 0.5 µm, preferably at least 1 µm, with preferably a size in the range of 1 µm to 10 µm, and more preferably in the range of 1 µm to 5 µm.

3. The scintillator array according to claim 1 wherein the separator particles are chemically inert metal oxides, for example $TiO_2$, $Al_2O_3$ or $MgO$, oxides like $SiO_2$, mineral powders like $CaCO_3$ or silicates, or wherein the separator particles are microbeads such as polymer microbeads, for example mono-sized cross-linked PMMA or PS beads.

4. The scintillator array according to claim 1 wherein the sides of the scintillator elements are partly covered in separator particles.

5. The scintillator array according to claim 4 wherein coverage of the sides of the scintillator elements in separator particles is less than 50%, preferably less than 10%, and more preferably between 0.1% and 5%.

6. The scintillator array according to claim 4 wherein the coverage of the sides of the scintillator elements lies in the range of 10 to 100000 per $mm^2$, and preferably in the range of 10 to 10000 per $mm^2$.

7. The scintillator array according to claim 1, wherein the sides of the scintillator elements are polished.

8. The scintillator array according to claim 1 wherein the scintillator elements are single crystals.

9. The scintillator array according to claim 1 wherein the scintillator elements are made of a material that has a ceramic or polycrystalline structure.

10. The scintillator array according to claim 1 wherein the scintillator array is configured to detect gamma radiation or x-ray radiation.

11. A method of manufacturing the scintillator array of claim 1, the method comprising:

providing individual scintillator elements; applying separator particles to at least one side of the individual scintillator elements; and assembling the individual scintillator elements into an array such that separator particles are situated between opposing sides of adjacent individual scintillator elements.

12. The method of manufacturing the scintillator array according to claim 11, wherein the separator particles are provided in the form of a powder, and the separator particles are applied by brushing or spraying the individual scintillator elements with the powder or by dipping the scintillator elements in the powder.

13. A radiation imaging detector comprising the scintillator array according to claim 1 and a photodetector array; wherein the photodetector array comprises a plurality of photodetector pixels; and wherein the plurality of photodetector pixels are in optical communication with the individual scintillator elements of the scintillator array.

14. The radiation imaging detector according to claim 13, wherein the optical communication comprises a 1:1 coupling between the photodetector pixels and the scintillator elements.

15. A medical imaging system comprising the radiation imaging detector according to claim 13.

* * * * *